US012566641B2

(12) United States Patent
Dubeyko et al.

(10) Patent No.: US 12,566,641 B2
(45) Date of Patent: Mar. 3, 2026

(54) SYSTEMS AND METHODS FOR OFFLOADING COMPUTATION TO A STORAGE DEVICE

(71) Applicants: Lemon Inc., Grand Cayman (KY); Beijing Youzhuju Network Technology Co., Ltd., Beijing (CN)

(72) Inventors: Viacheslav Dubeyko, Los Angeles, CA (US); Jian Wang, Beijing (CN)

(73) Assignees: Lemon Inc., Grand Cayman (KY); Beijing Youzhuju Network Technology Co., Ltd., Beijing (CN)

( * ) Notice: Subject to any disclaimer, the term of this patent is extended or adjusted under 35 U.S.C. 154(b) by 512 days.

(21) Appl. No.: 18/104,947

(22) Filed: Feb. 2, 2023

(65) Prior Publication Data

US 2023/0176921 A1     Jun. 8, 2023

(51) Int. Cl.
G06F 9/46          (2006.01)
G06F 9/50          (2006.01)

(52) U.S. Cl.
CPC .... G06F 9/5061 (2013.01); G06F 2209/5018 (2013.01); G06F 2209/509 (2013.01)

(58) Field of Classification Search
None
See application file for complete search history.

(56) References Cited

U.S. PATENT DOCUMENTS

| | | | |
|---|---|---|---|
| 2018/0173441 A1* | 6/2018 | Cargnini | G06F 3/065 |
| 2023/0030808 A1* | 2/2023 | Compton | G06F 11/3433 |

* cited by examiner

*Primary Examiner* — Bing Zhao
(74) *Attorney, Agent, or Firm* — BakerHostetler

(57) ABSTRACT

The present disclosure describes techniques for offloading computation into a storage space. A plurality of streams may be created in a storage device in response to receiving information of defining the plurality of streams from an application. Each of the plurality of streams may be configured to contain a sequence of objects of a same type among a plurality of types of objects. The plurality of types of objects may be associated with one or more applications. Each of the plurality of streams may comprise a thread descriptor indicative of at least one algorithm to be applied to the sequence of objects. Data may be added to the plurality of streams. Computation associated with the plurality of streams may be offloaded into the storage device. The storage device may be associated with at least one computational core.

20 Claims, 17 Drawing Sheets

700

Storage Device 304

Item (64 Bytes)

Item (4 KB)

Stream 1

Stream N

300

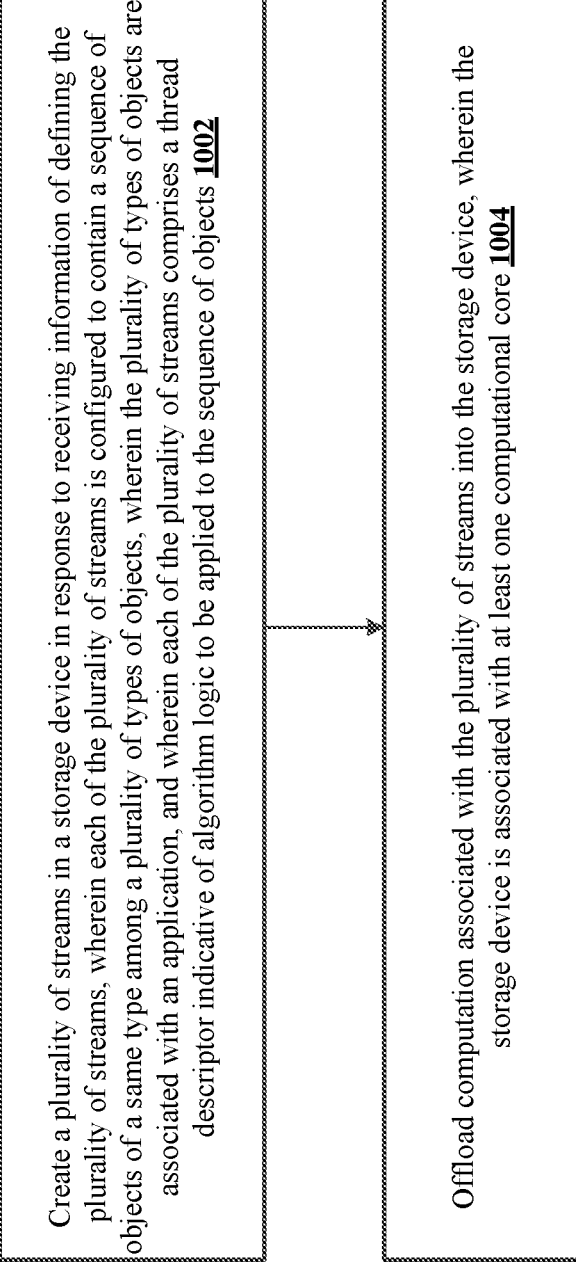

Create a plurality of streams in a storage device in response to receiving information of defining the plurality of streams, wherein each of the plurality of streams is configured to contain a sequence of objects of a same type among a plurality of types of objects, wherein the plurality of types of objects are associated with an application, and wherein each of the plurality of streams comprises a thread descriptor indicative of algorithm logic to be applied to the sequence of objects 1002

Offload computation associated with the plurality of streams into the storage device, wherein the storage device is associated with at least one computational core 1004

Generate stream identifiers of identifying a plurality of streams, wherein each of the plurality of streams is configured to contain a sequence of objects of a same type among a plurality of types of objects 1102

Allocate blocks for the plurality of streams to persistently store objects in the plurality of streams into a storage device 1104

Offload computation associated with the plurality of streams into the storage device, wherein the storage device is associated with at least one computational core 1106

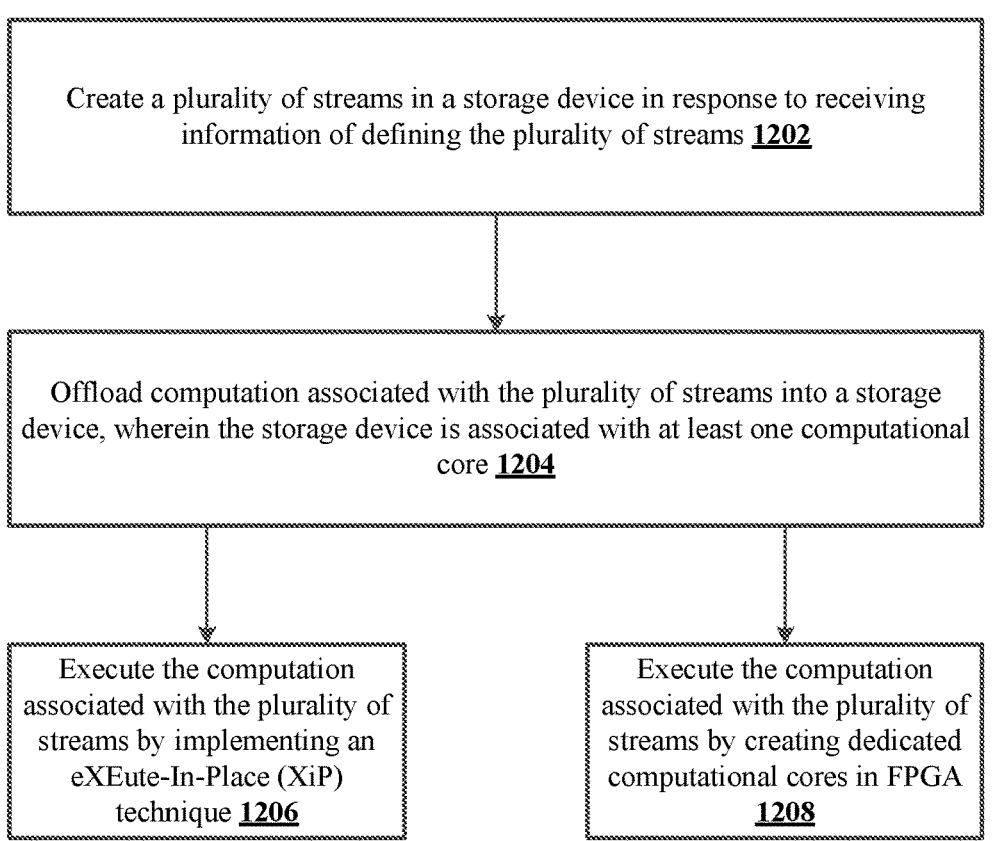

Create a plurality of streams in a storage device in response to receiving information of defining the plurality of streams 1202

Offload computation associated with the plurality of streams into a storage device, wherein the storage device is associated with at least one computational core 1204

Execute the computation associated with the plurality of streams by implementing an eXEute-In-Place (XiP) technique 1206

Execute the computation associated with the plurality of streams by creating dedicated computational cores in FPGA 1208

Create a plurality of streams in a storage device in response to receiving information of defining the plurality of streams 1302

Create one or more tables based on the plurality of streams, wherein the one or more tables are configured to implement data group operations 1304

Offload computation associated with the one or more tables into the storage device, wherein each of the one or more tables corresponds to a dedicated thread for orchestrating activity of threads associated with streams comprised in each of the one or more table 1306

Create a plurality of streams in a storage device in response to receiving information of defining the plurality of streams from an application, wherein each of the plurality of streams comprises a thread descriptor indicative of algorithm logic to be applied to a sequence of objects and an item descriptor comprising metadata associated with the sequence of objects 1402

Offload computation associated with the plurality of streams into the storage device, wherein the storage device is associated with at least one computational core 1404

Extract a result of the computation by the application from the storage device 1406

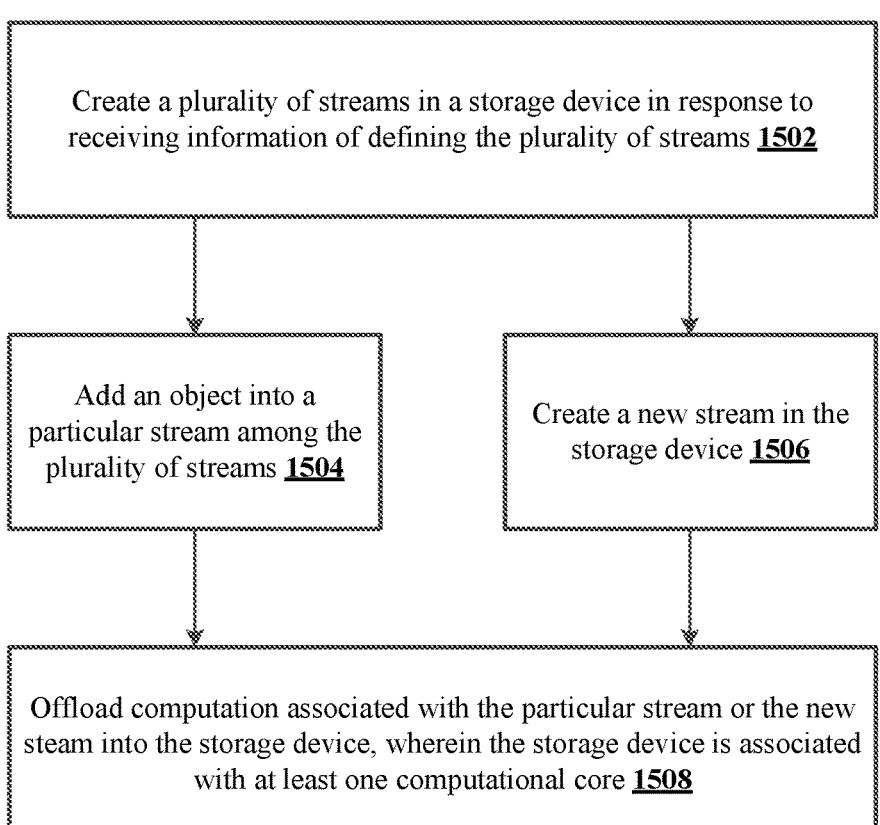

Create a plurality of streams in a storage device in response to receiving information of defining the plurality of streams 1502

Add an object into a particular stream among the plurality of streams 1504

Create a new stream in the storage device 1506

Offload computation associated with the particular stream or the new steam into the storage device, wherein the storage device is associated with at least one computational core 1508

FIG. 15

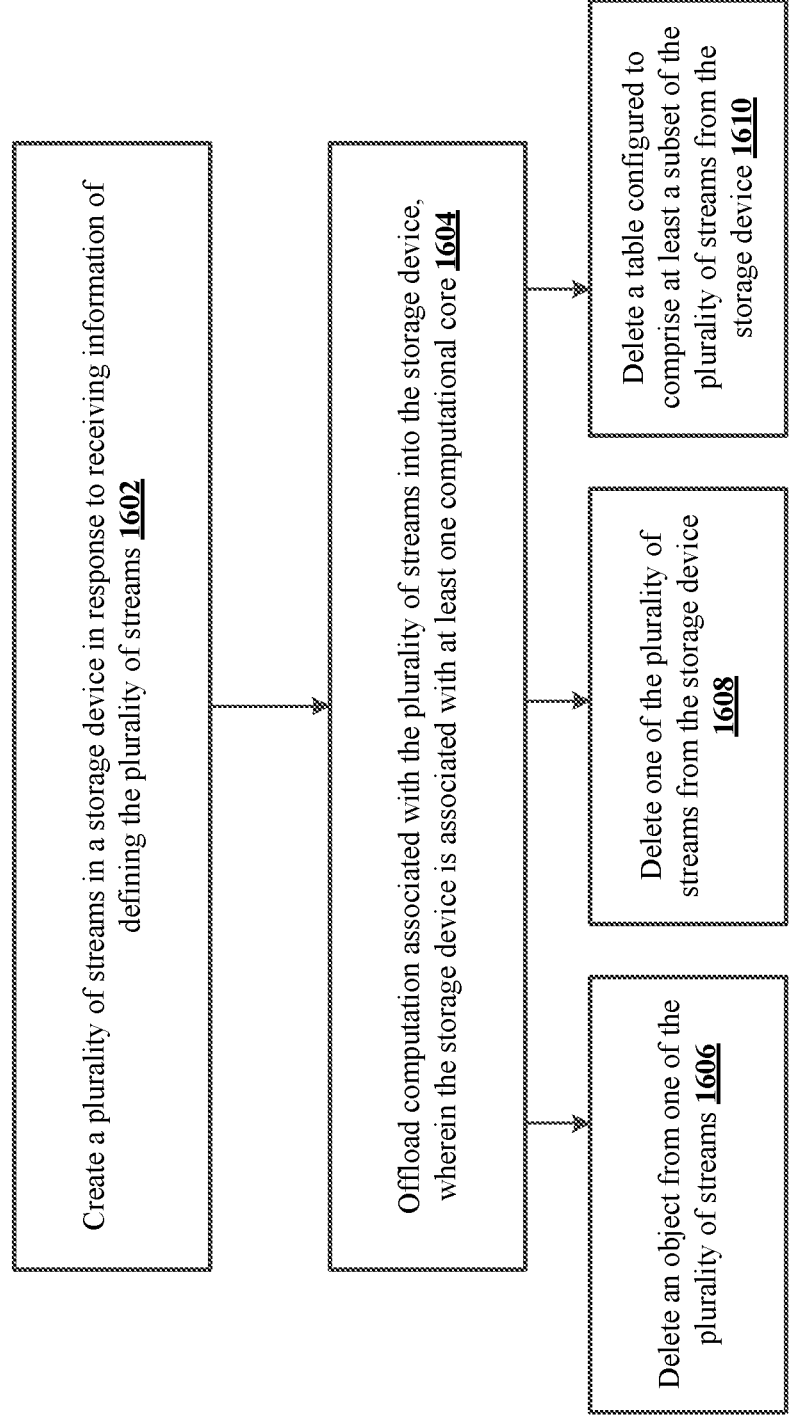

1600

Create a plurality of streams in a storage device in response to receiving information of defining the plurality of streams 1602

Offload computation associated with the plurality of streams into the storage device, wherein the storage device is associated with at least one computational core 1604

Delete an object from one of the plurality of streams 1606

Delete one of the plurality of streams from the storage device 1608

Delete a table configured to comprise at least a subset of the plurality of streams from the storage device 1610

SYSTEMS AND METHODS FOR OFFLOADING COMPUTATION TO A STORAGE DEVICE

BACKGROUND

Companies and/or individuals are increasingly utilizing and/or producing a large quantity of data. Such data may need to be collected, stored, and translated into usable information (e.g., processed). Improved techniques for data processing are desirable.

BRIEF DESCRIPTION OF THE DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 10 shows an example process for offloading computation in accordance with the present disclosure.

FIG. 11 shows an example process for offloading computation in accordance with the present disclosure.

FIG. 12 shows an example process for offloading computation in accordance with the present disclosure.

FIG. 13 shows an example process for offloading computation in accordance with the present disclosure.

FIG. 14 shows an example process for offloading computation in accordance with the present disclosure.

FIG. 15 shows an example process for offloading computation in accordance with the present disclosure.

FIG. 16 shows an example process for offloading computation in accordance with the present disclosure.

DETAILED DESCRIPTION OF ILLUSTRATIVE EMBODIMENTS

Figure 1:
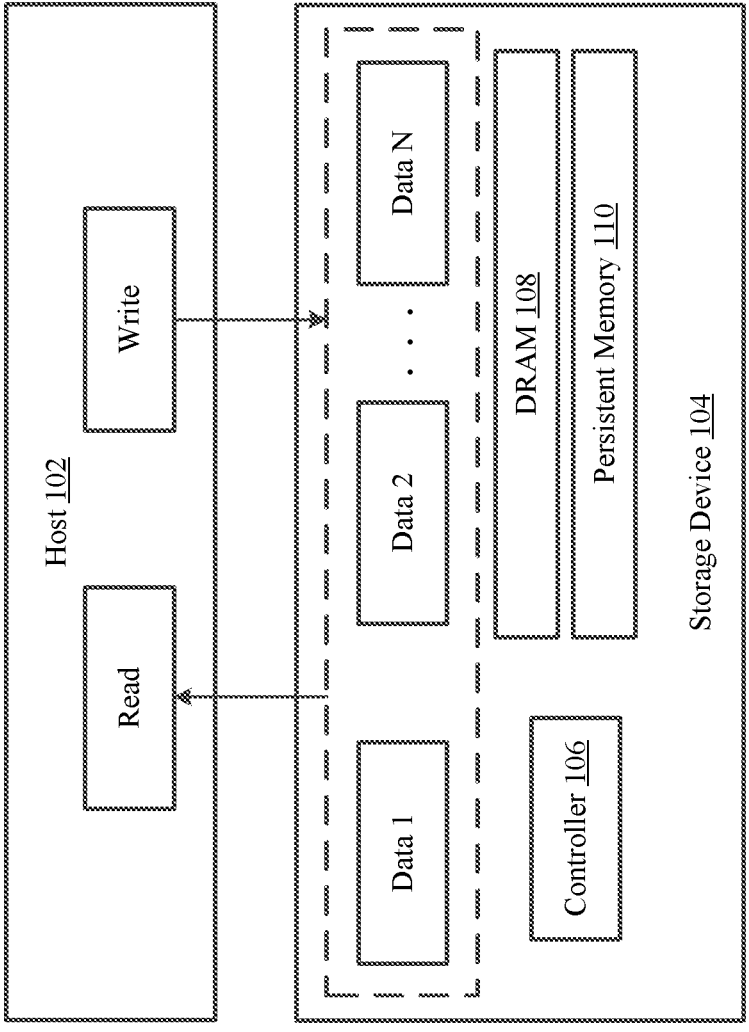
FIG. 1 shows an example framework for computation in accordance with the present disclosure.

Any storage device may implement the abstraction of physical sectors (e.g., logical blocks). A host (e.g., application) or a file system may read data from or write data to the storage device using read/write operations of physical sectors. Physical sector abstraction may isolate the host from peculiarities associated with the persistent memory of the storage device. A controller of the storage device may manage the complexity of the persistent memory. The storage device may comprise dynamic random-access memory (DRAM) as a buffer for input/output (I/O) requests and data. The host may place I/O request(s) in a queue of the storage device, such as in DRAM. The controller may retrieve I/O request from the queue, implement a requested operation by reading or writing persistent memory, and store the result of the operation into DRAM. The result of operation may then be delivered from DRAM to the host. The fundamental basis of these operations is the physical sector concept—the host can see and can operate by physical sectors only. This may create a robust concept of I/O operations with the storage device. However, existing storage device architecture and computation paradigm may introduce performance issues and throughput bottlenecks. Requirements for faster data processing are growing, but Central Processing Unit (CPU)-centric data processing and storage device architecture cannot provide a way to steadily improve data processing performance. Thus, improved techniques for data processing are desired.

The CPU-based model of calculation may be one of the key obstacles to enhancing the performance of data processing (e.g., calculations). The CPU-based model of calculation requires moving data and/or code from persistent memory into dynamic random-access memory (DRAM), and from DRAM into one or more CPU cache(s). Calculation may be executed by means of sharing one or more CPU core(s) amongst multiple threads of execution. However, this computation paradigm introduces a significant number of drawbacks that prevent improved computation performance. For example, this computation paradigm may cause problems with cache coherence, memory wall, and data moving. To address the drawbacks introduced by the CPU based model of calculation, computation may be offloaded into data storage space. If computation is offloaded into the data storage space, computational storage or memory may process data in the storage space, thereby bypassing CPU cores.

However, this approach is not easy to implement in a CPU-centric or algorithm-oriented computing paradigm. The CPU may need to deliver instructions (e.g., algorithm logic) from the host's DRAM into the storage device's DRAM (or persistent memory) to execute the instructions by computational core(s) on the storage device side. Any algorithm may be stored into persistent memory as an executable file. The logic of data processing may already be stored in the storage space, and the CPU may inform the DPU(s) what file (or executable image) can be used to execute data the processing.

The CPU and the DPUs may represent different platforms (for example, x86 and ARM, respectively). Thus, the DPUs may be unable to execute code that is built for the CPU's platform. It may be possible to compile code for the platform of the DPUs or to use a just-in-time (JIT) compiler approach. It may also be possible to implement the logic of data processing by means of field-programmable gate array (FPGA) based cores. The CPU may need to start, manage, and orchestrate activity of the DPUs in storage or memory space. Thus, CPU-centric computing may still introduce significant overhead and be a bottleneck in the case of data-centric computing in storage. Described herein are improved techniques for offloading computation based on an application-defined storage architecture.

The improved techniques described here introduce a new storage device architecture that is configured to service host (e.g., application) operations more efficiently. FIG. 1 shows an example framework 100 for computation. The framework 100 comprises a host 102 and a storage device 104. A controller 106 of the storage device 104 may manage the complexity of the persistent memory 110. The storage device 104 may comprise dynamic random-access memory (DRAM) 108 as a buffer for input/output (I/O) requests and data (e.g., Data 1-Data N, which may represent logical block addresses (LBAs) that can be accessible by the host). The host 102 may place read or write request(s) in a queue of the storage device 104, such as in DRAM 108. The controller 106 may retrieve a request from the queue, implement a requested operation by reading or writing persistent memory 110, and store the result of the operation into DRAM 108. The result of operation may then be delivered from DRAM 108 to the host 102.

Figure 2:
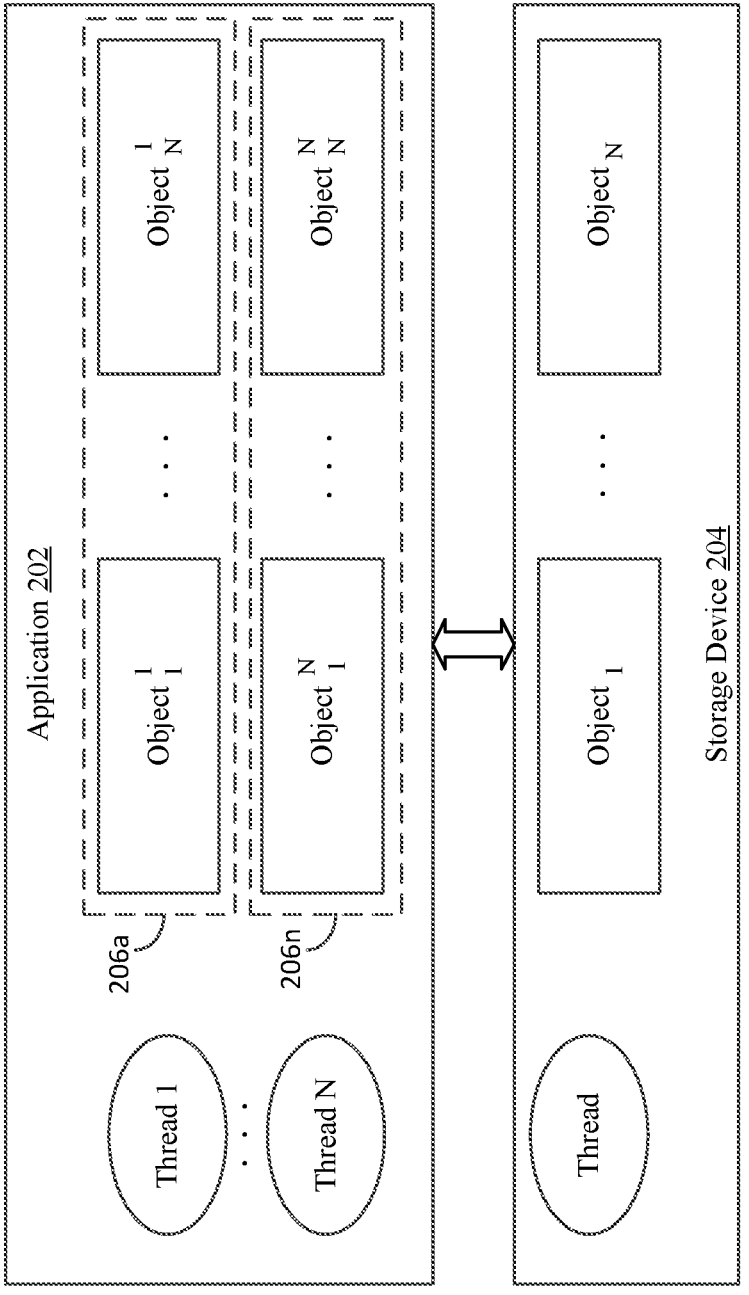
FIG. 2 shows an example application-defined storage architecture in accordance with the present disclosure.

FIG. 2 shows an example application-defined storage architecture 200. The architecture 200 comprises an application 202 on the host side and a storage device 204. The host may comprise a CPU for executing instructions (e.g., applying algorithms to data) and a DRAM for keeping the application and data during execution. The application 202 may be represented by a set of threads (e.g., Thread 1-Thread N). Each thread may correspond to a piece of allocated memory in DRAM that contains executable code. Each thread may operate based on a set (e.g., sequence) of objects each of which correspond to a piece of allocated memory for storing in DRAM. The responsibility of the thread may be to apply some algorithm on the sets of objects. For example, Thread 1 shown in the example of FIG. 2 may apply algorithm on the set of objects 206a and Thread N may apply algorithm on the set of objects 206n. If data are stored in persistent memory, then the data may need to be copied into DRAM on the host side (e.g., into application buffer(s)) and be represented as piece(s) of memory. The algorithm can be applied for any piece of memory and the application logic can treat piece(s) of memory as object(s).

In embodiments, the computational operations may be offloaded into the storage device 204. The application 202 may define an architecture of the storage device 204 by means of definition granularity, the structure of objects, and the logic of thread(s). The application 202 may be configured to define and expose the internal objects into the persistent storage space. This representation of data may be used to store data, organize data, and operate on data on the storage device 204 side. The application 202 may be configured to define threads' logic associated with particular object type(s) and to offload this logic as a hardware-based thread on the storage device 204 side. The application 202 may define the model of data representation and offload computation to the storage device 204 side, thus bypassing the file system or any other software layer.

Thus, a user-space application can directly interact with the storage device, bypassing any complex functionality on the kernel-space side. The application 202 is able to expose an internal representation of data (and a logic of data transformation) on the storage device 204 side without needing to use file abstractions. Thus, if data can be processed in the storage device, the amount of data that needs to be moved between the host and the storage device may be decreased. This application-defined storage architecture concept guarantees high performance and low latency data operations. A compute express link (CXL) interface may provide memory semantics and cache coherence to access, operate, offload computation, and manipulate data in persistent storage. The application 202 may employ computation offloading for data that is already stored in persistent memory.

Figure 3:
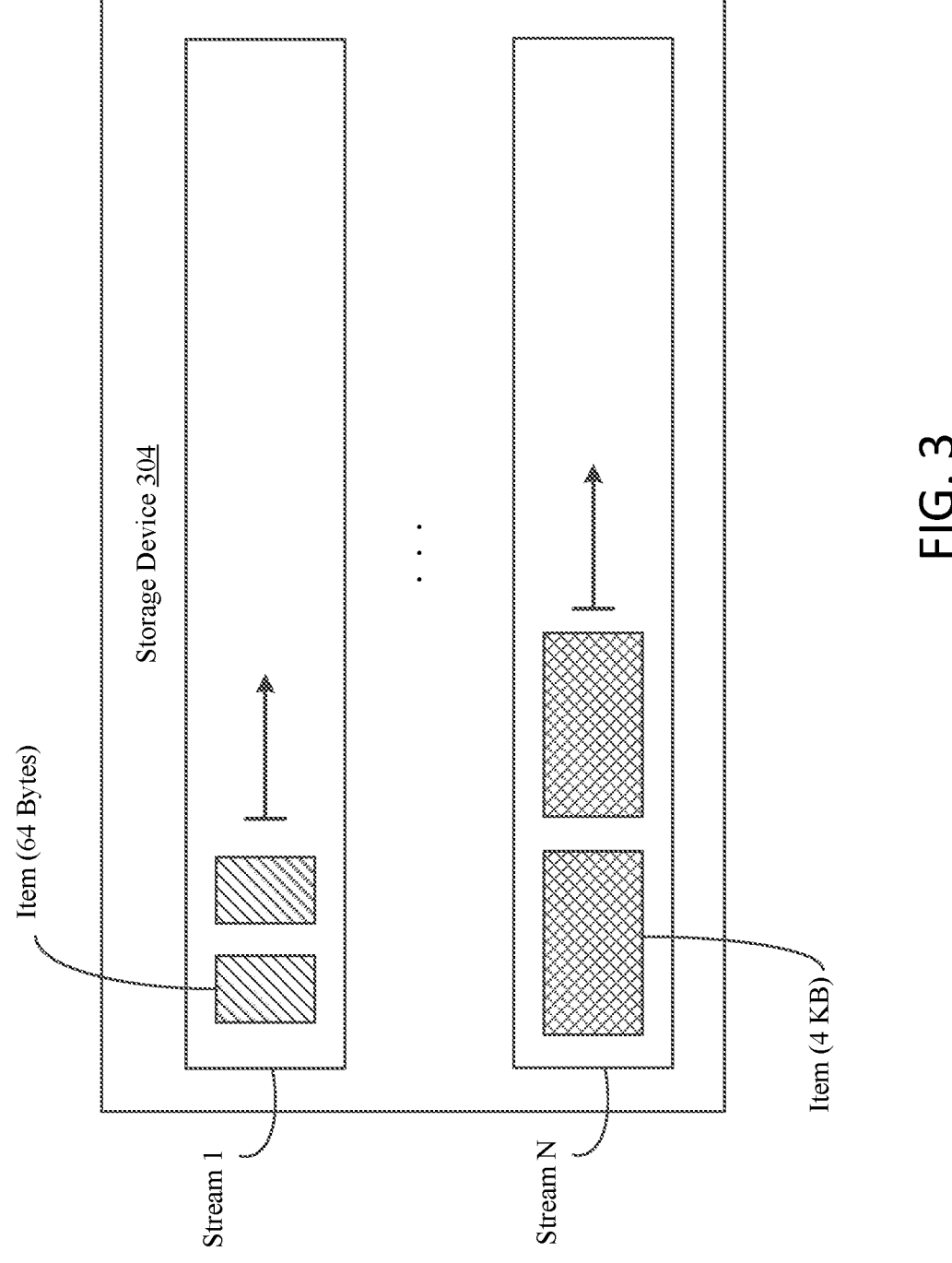
FIG. 3 shows an example application-defined storage architecture in accordance with the present disclosure.

An application may operate based on various types of object. Each object may be characterized by a granularity and a structure. However, an application may operate based on arrays or sets of objects. A stream may be used as a container to store multiple objects of the same type. A storage device may support multiple streams. FIG. 3 shows an example application-defined storage architecture 300. The architecture 300 comprises a storage device 304. The storage device 304 may comprise a plurality of streams (e.g., Stream 1-Stream N). Each of the plurality of streams may store multiple objects of the same type. For example, Stream 1 may store multiple 64-byte objects. Stream N may store multiple 4KB objects.

An application may request the creation of one or more streams with some capacity. The application may define the size or granularity of one object instance. The application may define an object structure or metadata describing the type, granularity, and sequence of the object's fields. The storage device 304 may use this knowledge to allocate memory for objects, to store objects, and/or to manipulate objects. Some similarities exist between a file and a stream. However, a file is a concept that a file system implements, and a stream can be implemented by the storage device 304 itself. As a result, an application can use the stream instances directly without needing to employ any software mediators, such as a file system. If a stream represents a sequence of objects in the same type (granularity), then any object may be accessed by index (such as in an array) by both an application and the storage device. A stream may be identified by ID. For instance, a stream may be identified by name and/or a hash associated with the name.

Figure 4:
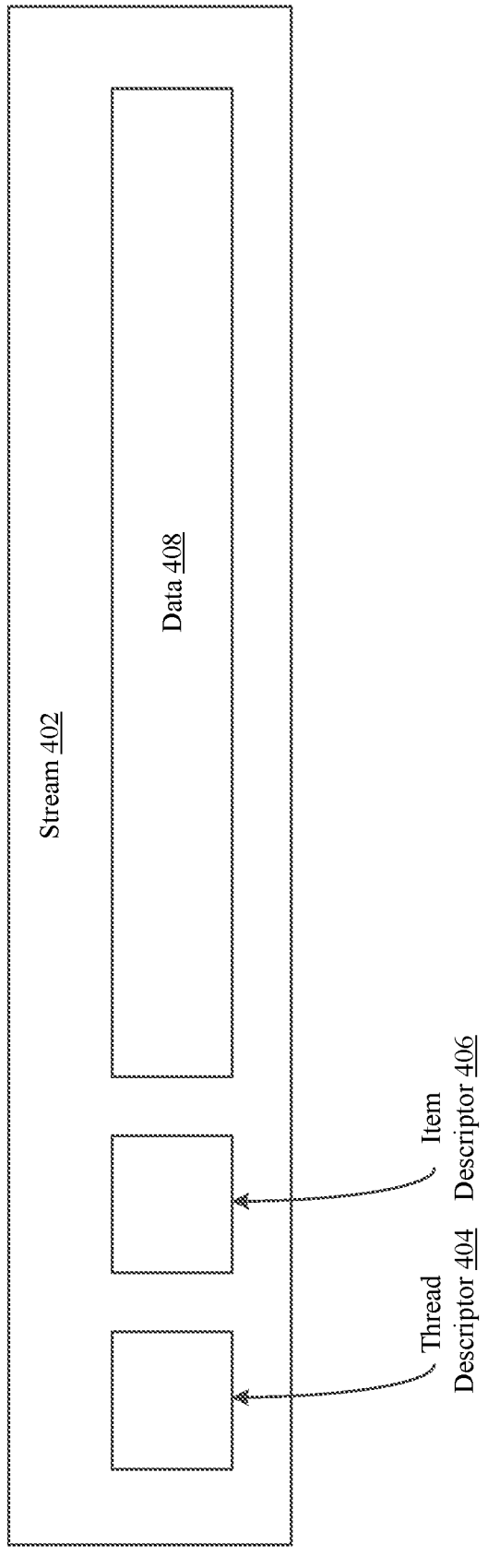
FIG. 4 shows an example stream in accordance with the present disclosure.

A stream may comprise a thread descriptor that may describe one or more algorithms, an item descriptor, and data (e.g., a sequence of objects). FIG. 4 shows an example stream 400. The stream 400 comprises a thread descriptor 404. The thread descriptor 404 may be indicative of algorithm logic to be applied to the data 408 (e.g., the sequence of objects) associated with the stream 400. For example, the thread descriptor 404 may be indicative of algorithm logic to be applied to the data on the storage device side. An application may use this logic to offload data processing into persistent memory on the storage device side. The stream 404 may additionally comprise an item descriptor 406. The item descriptor 406 may comprise metadata that defines the size or granularity of one object instance. The item descriptor 406 may comprise metadata describing the type, granularity, and sequence of object's fields. The item descriptor 406 may describe the stream at whole (e.g., a number of items in the stream, an available capacity of the stream, etc.)

Figure 5:
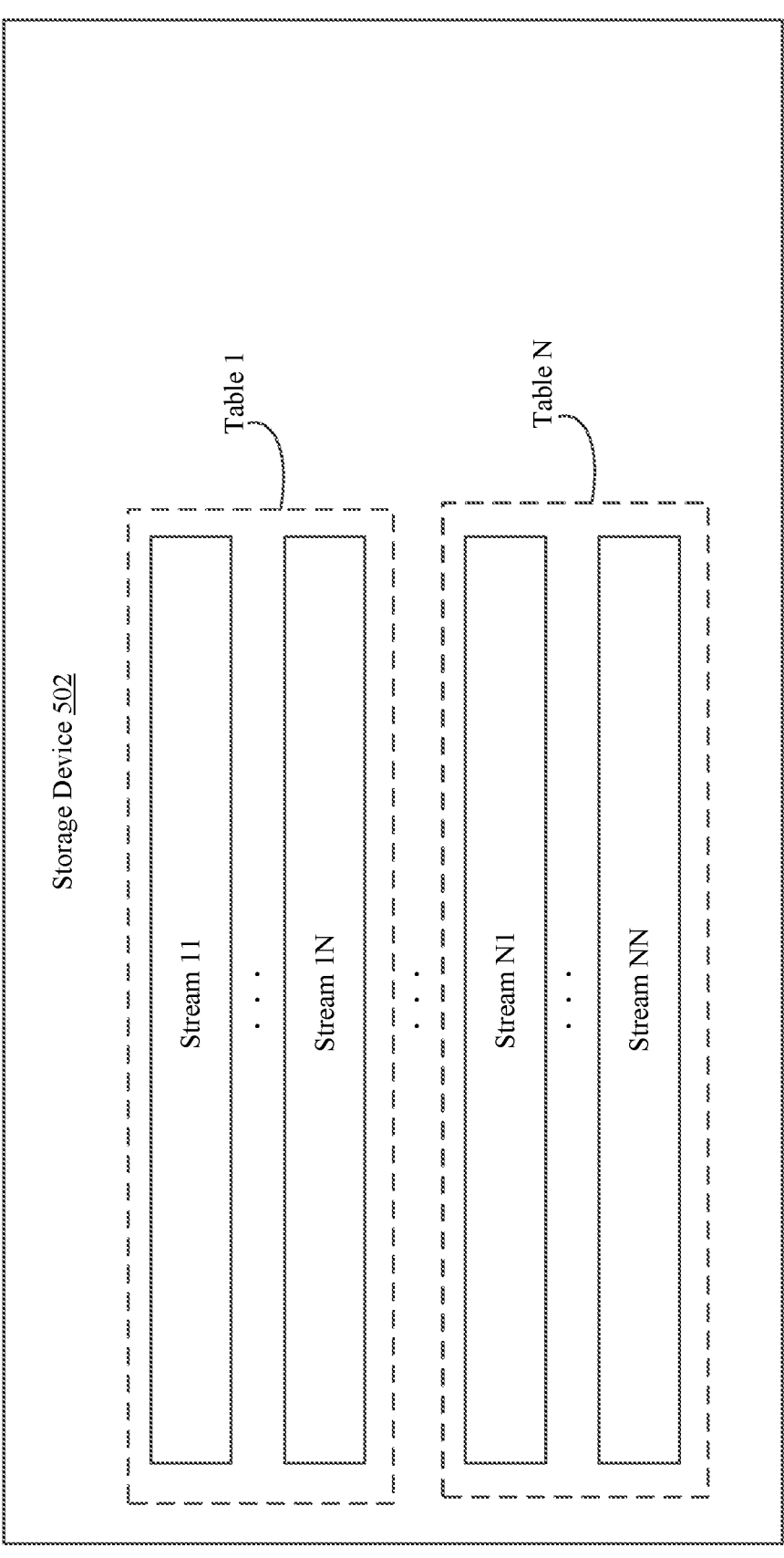
FIG. 5 shows example tables in accordance with the present disclosure.

In embodiments, a plurality of streams may be combined into a table. A storage device may be able to support the aggregation of streams into tables. FIG. 5 shows an example storage device 502 that includes tables (e.g., Table 1-Table N). Each of the tables may comprise a plurality of streams. For example, Table 1 comprises Stream 11-Stream 1N, and Table N comprises Stream N1-Stream NN. Each table may be utilized to implement group operations with data. A table instance can be represented by a special metadata record, similar to the metadata record describing a stream instance. Each table may be associated with a dedicated thread with special logic. The special logic may be configured to orchestrate the activity of streams' threads associated with that table.

Figure 6:
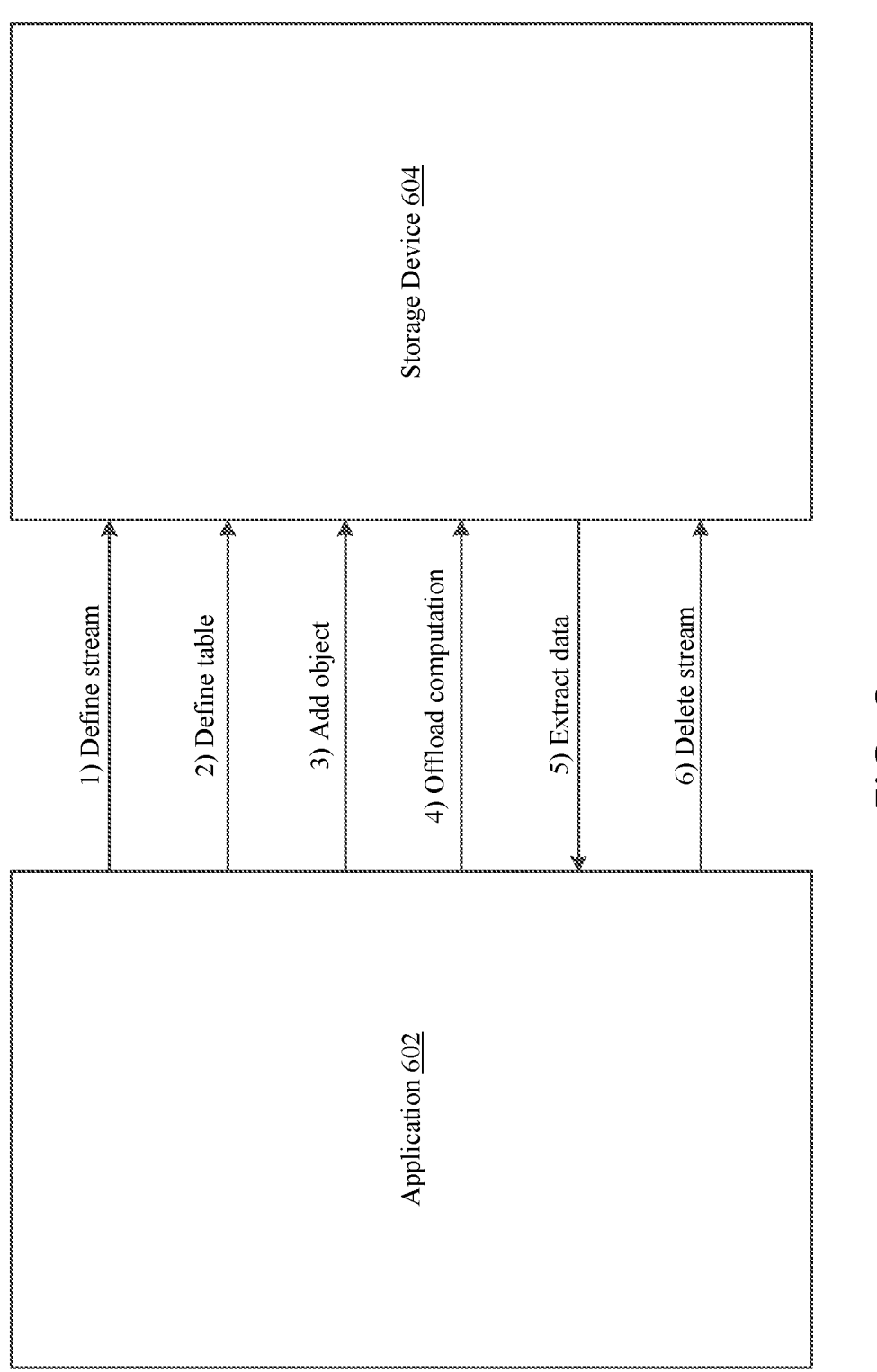
FIG. 6 shows an example framework for offloading computation in accordance with the present disclosure.

The application-defined storage architecture described herein may require a specialized programming model. This programming model may include a series of operations. FIG. 6 shows an example series of operations. The series of operations may comprise, a numeral 1, defining for creation of one or more streams in a storage device 604. The stream(s) may be defined by an application 602. At numeral 2, the application 602 may define for creation of one or more tables. As discussed above, each table may comprise one or more streams. At numeral 3, the application 602 may be configured to add an object into a particular stream, such as a particular stream in a particular table. At numeral 4, the application 602 may be configured to offload computation associated with streams and/or tables into the storage device 604. At numeral 5, the application 602 may be configured to extract data or the result of the computation from the storage device 602. At numeral 6, the application may be configured to delete object(s) from a particular stream. Additionally, or alternatively, the application may be configured to delete stream(s) from the storage device 604. Additionally, or alternatively, the application may be configured to delete table(s) from the storage device 604. This programming model may facilitate the exposure and/or creation of a data representation on the storage device side that is compatible with the application's requirements and internal organization. The application-defined storage architecture may provide a way to build, access, or manipulate data in the storage device in the most efficient way that the application can define using application specific algorithms.

Figure 7:
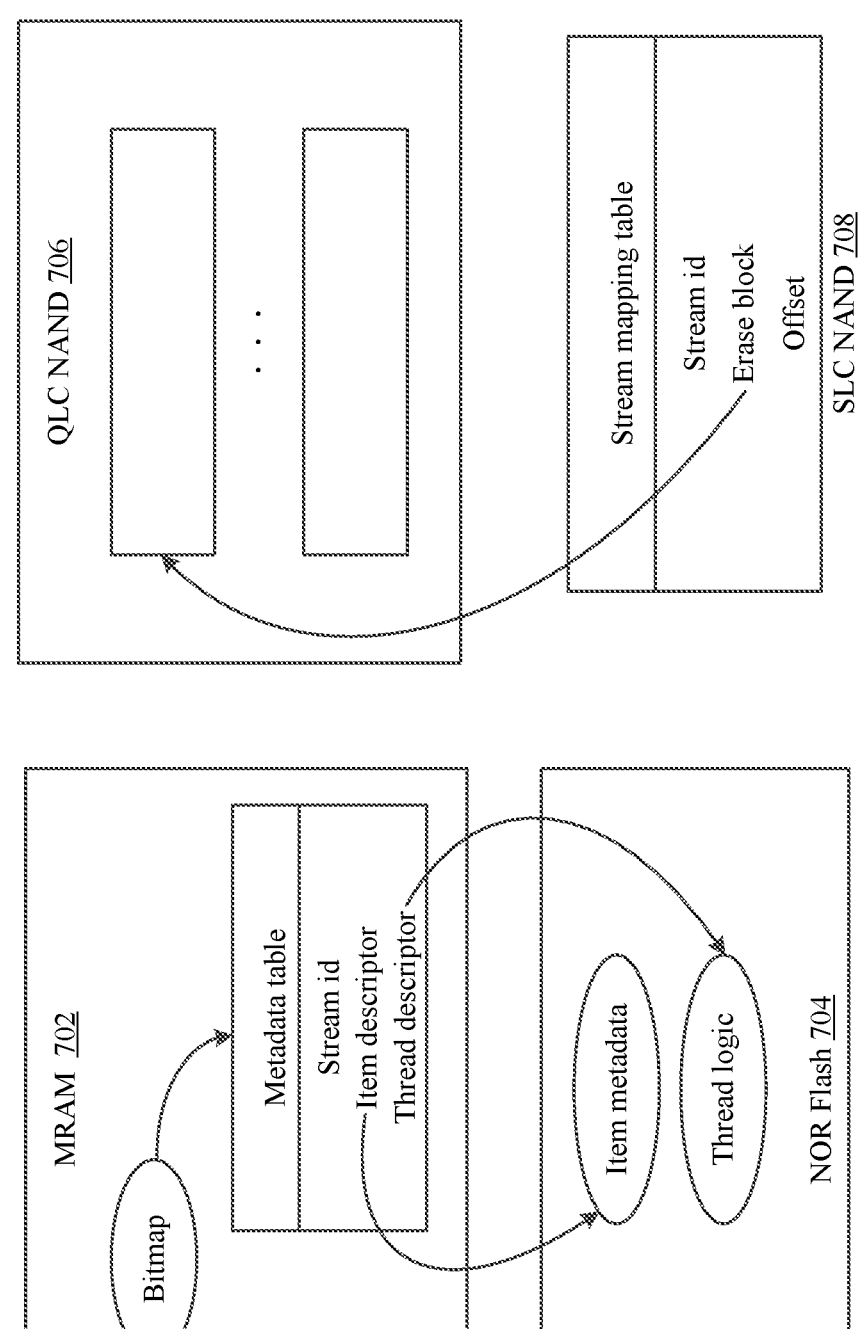
FIG. 7 shows example metadata structures in accordance with the present disclosure.

To implement the stream concept described above, a storage device may need to use several metadata structures and types of memory. FIG. 7 shows example metadata structures on the storage device side. Magnetoresistive random-access (MRAM) memory 702 may be used as a persistent replacement of DRAM. Because, MRAM 702 has latency comparable with DRAM, it is byte-addressable memory, and it has good endurance, MRAM 702 may be used to store a bitmap and metadata table. NOR flash 704 may be used to store object metadata descriptor(s) and thread logic. NOR flash 704 may implement an eXecute-In-Place (XiP) technique. The XiP technique may be used to execute the logic of threads on the storage device side.

The computational core(s) may be implemented as Advanced RISC Machine (ARM) core(s) shared among multiple stream/table threads. Additionally, or alternatively, the computational core(s) may be implemented as RISC-V cores in Field Programmable Gate Array (FPGA). If the computational core(s) are implemented as RISC-V cores in FPGA, the computational cores may be implemented as dedicated cores to a particular stream or table. A single-level cell (SLC) NAND 708 or multi-level cell (MLC) NAND may be used to store a stream mapping table. The stream mapping table may be configured to map one or more erase blocks to a particular stream. A quad-level cell (QLC) NAND 706 (or a triple-level cell (TLC) NAND or 3D NAND) may be used as the main space to store objects in streams persistently. In some embodiments, DRAM may be needed to operate data stored in QLC/TLC NAND flash. In other embodiments, data may be accessed or processed directly in the QLC NAND 706. For example, specialized core(s) may be used to manipulate data directly in QLC NAND flash.

DRAM may be used to pre-fetch and process data by dedicated stream threads. The bitmap stored in MRAM 702 may be used as a metadata structure to allocate and track the state of streams. The bitmap may contain a number of bits that represents a maximum capacity of a steam to be created. The storage device may check the bitmap for the first available clean bit and may define an identifier (ID) for a newly created stream. The bitmap may be used to check the ID that the application may provide to access a particular stream. The metadata table stored in MRAM 702 may comprise information about a metadata structure and a stream ID. The metadata structure may indicate the location of item metadata and thread logic in the NOR flash 704. The stream mapping table stored in the SLC NAND 708 may associate the stream ID with an erase block (or a set of erase blocks). The stream mapping table may contain an offset into a particular erase block to indicate the position to add objects into an erase block.

Figure 8:
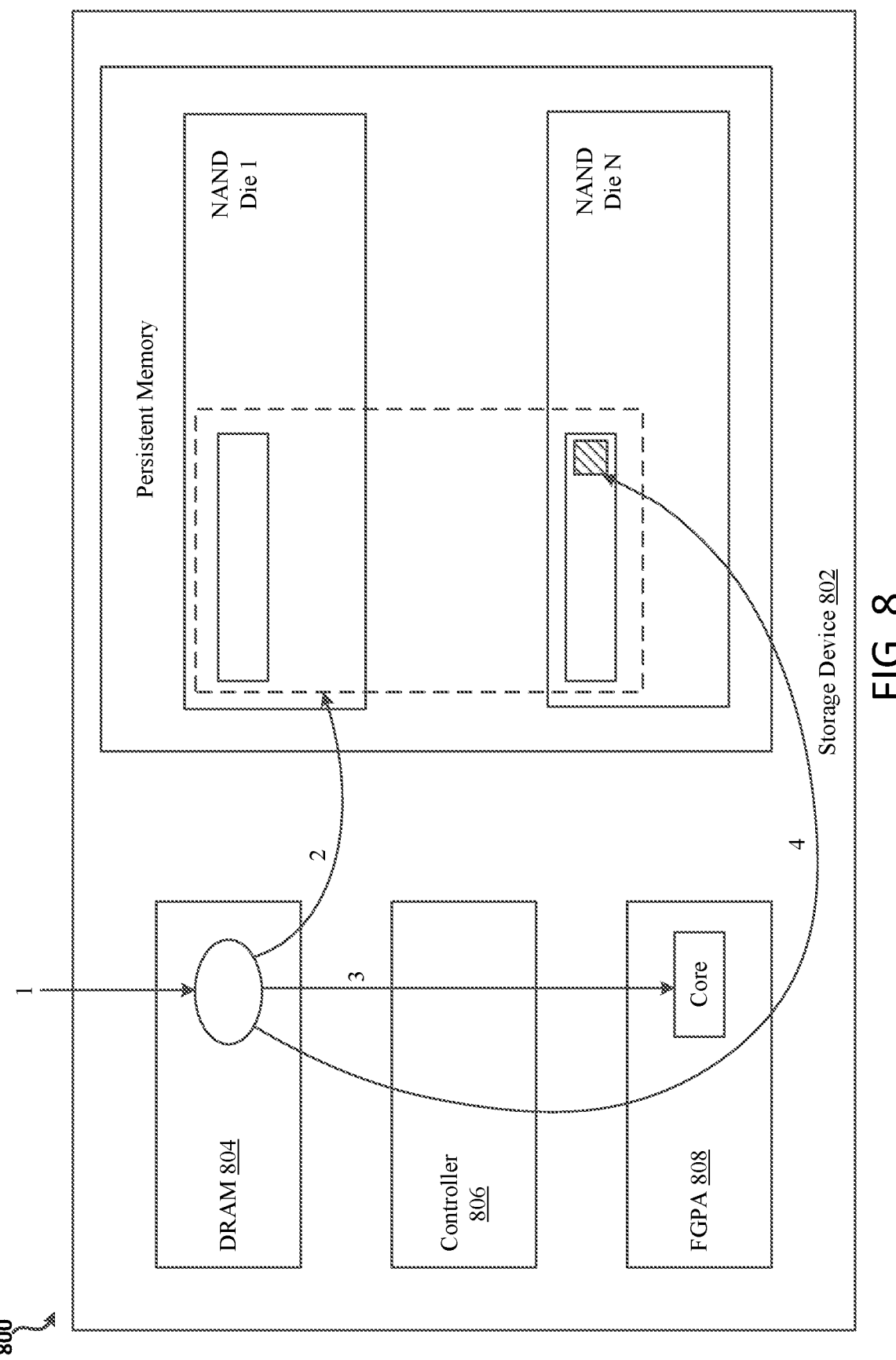
FIG. 8 shows an example hardware implementation of a stream model in accordance with the present disclosure.

FIG. 8 shows an example hardware implementation 800 of a stream model. To create a stream, an application may request the creation of the stream. To request the creation of the stream, at numeral 1, the application may send a stream descriptor to a storage device 802. The storage device 802 may receive the stream descriptor. The stream descriptor may be initially stored into DRAM 804 (or MRAM) in the storage device 802. The storage device 802 may comprise a controller 806. At numeral 2, the controller 806 may allocate or map one or more erase blocks for the stream. For example, the controller 806 may allocate or map one or more erase blocks for the stream in the persistent memory of the storage device 802. At numeral 3, the controller 806 may create one or more dedicated computing core(s) in FPGA. At numeral 4, the controller 806 may store a stream descriptor and thread logic into the persistent memory. The thread logic may be a part of the I/O request that requested the stream creation, and/or the thread logic may already be kept on the storage device side and the I/O request may identify the location of the thread logic in persistent memory. As a result, thread logic can be copied into NOR flash. The computational core(s) may be created in multiple different ways. For example, a RISC-V core can implement a computational core. The RISC-V computational core may be cloned from an initial instance. The RISC-V computational core may execute algorithm logic by means of XiP technology by accessing algorithm logic in NOR flash. The algorithm logic may alternatively, or additionally, be implemented by means of creating a specialized FPGA core 808. If the algorithm logic is implemented by means of creating a specialized FPGA core 808, the application may need to deliver code that is capable of creating the FPGA core to the storage device 802 and/or identify code that is already stored in the storage device.

Figure 9:
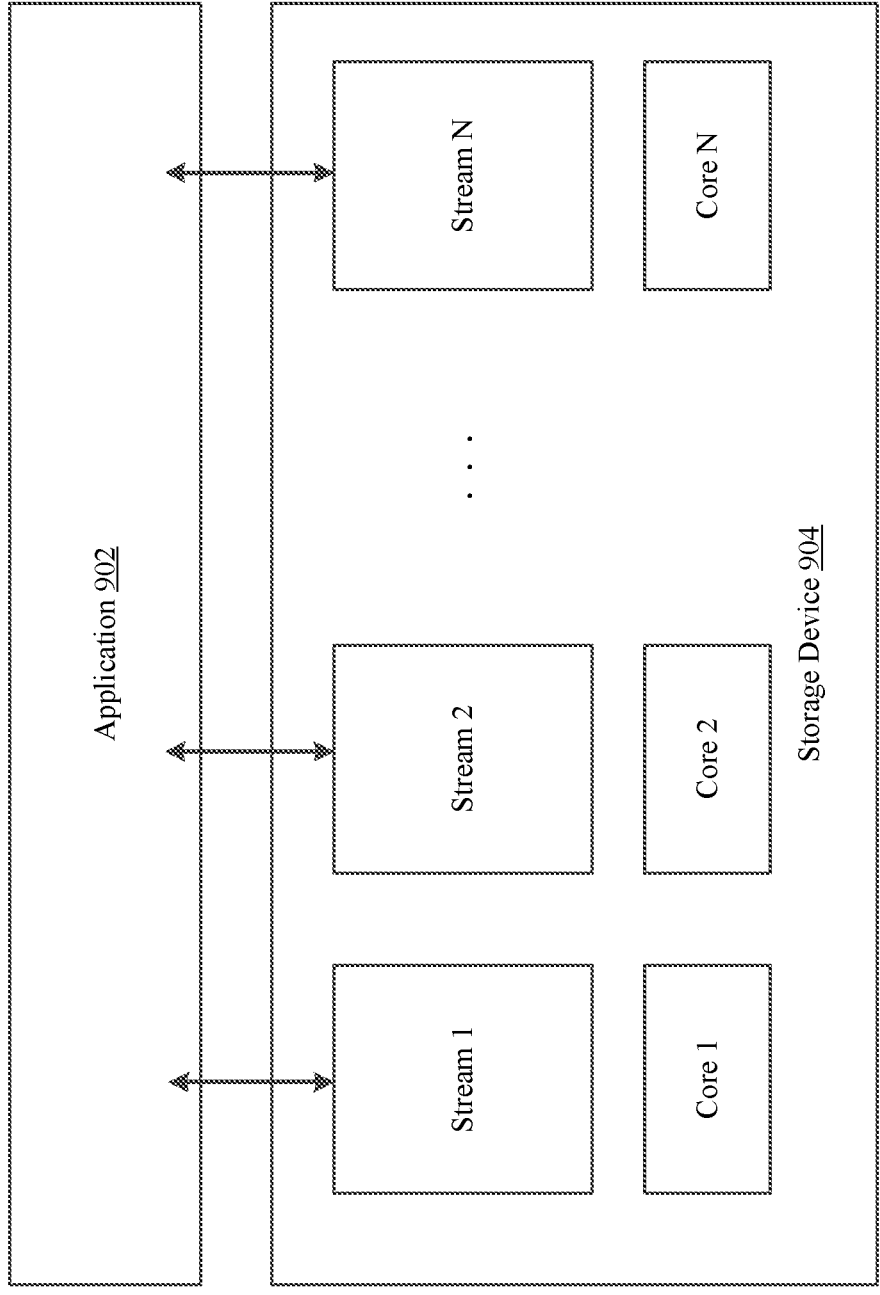
FIG. 9 shows an example interaction between an application and a storage device in accordance with the present disclosure.

FIG. 9 illustrates an example model 900 showing interaction(s) between a host, e.g., an application 902 and a storage device 904. The application 902 may define for creation of multiple streams (e.g., Stream 1-Stream N) in the storage device 904. Each of the multiple streams may be associated with its own dedicated thread. For example, the Stream 1 is associated with its own dedicated thread Core 1, the Stream 2 is associated with its own dedicated thread Core 2, and so on. Each of the multiple streams may contain a sequence of objects. Each object in the sequence of objects may be associated with the same type (e.g., granularity).

A logic of operations associated with a sequence of objects in the stream may be offloaded to the storage device 904 side by the application 902. The application 902 may be able to directly build any data representation in the storage device 904, bypassing any other software layers. For example, the application 902 may be able to directly build any data representation in the storage device 904, bypassing the file system. In embodiments, the application 904 may still continue to use names to access streams, as a stream may be treated like a file. Also, streams can be aggregated into tables that look like a folder. A table may be able to provide a more powerful and flexible concept. The storage device 904 may implement a stream and table support. The stream and table support may prevent the need to use a file system at all, or the stream and table support may be able to simplify the file system logic dramatically. The operations associated with the model 900 may comprise one or more of creating streams, adding objects into streams, offloading computation into the storage device 904, extracting computation results from the storage device 904, and deleting stream(s). The application may define when streams need to be deleted or saved in the persistent memory. Streams can survive between application instance running. Thus, several instances of the same or different applications may share and use data in streams.

The application-defined storage architecture described herein is configured to expose the application's internal representation of data and the logic of data transformation on the storage device side without needing to use file abstractions. The techniques described herein introduce a flexible model of changing a storage device architecture model by means of exposing the application's internal representation of data. The application-defined storage architecture described herein is capable of significantly increasing the performance of data operations. For example, the application-defined storage architecture described herein may exclude overhead associated with the file system. The application-defined storage architecture described herein may decrease the overhead associated with context switches. The application-defined storage architecture described herein may reduce the latency of data operations because data can be processed near persistent memory in the storage device. The application-defined storage architecture described herein may be configured to offload data computation into the storage device, such as near-memory computing. The application-defined storage architecture described herein may decrease power consumption of data processing by means of excluding the need to move data and to keep all data in DRAM on the host side, as DRAM needs to use the refresh operation to keep data safe (this is a power-hungry operation). The application-defined storage architecture described herein may execute data operations and employ parallel data processing on the storage device side.

FIG. 10 illustrates an example process 1000. The process 1000 may be performed for offloading computation into a storage device. Although depicted as a sequence of operations in FIG. 10, those of ordinary skill in the art will appreciate that various embodiments may add, remove, reorder, or modify the depicted operations.

At 1002, a plurality of streams may be created in a storage device. The plurality of streams may be created in the storage device in response to receiving information of defining the plurality of streams from a host. The host may comprise a CPU for executing an application (e.g., applying algorithms to data) and a DRAM for keeping the application and data during execution. Each of the plurality of streams may be configured to contain a sequence of objects of a same type (e.g., granularity) among a plurality of types of objects. For example, all objects in a particular sequence may be of the same type. The plurality of types of objects may be associated with the application. Each of the plurality of streams may comprise a thread descriptor. The thread descriptor may be indicative of at least one algorithm logic. The algorithm logic may be applied to the sequence of objects.

At 1004, computation associated with the plurality of streams may be offloaded into the storage device. The application may add data in the plurality of streams, and multiple objects may be stored into a persistent memory. The storage device may be associated with at least one computational core. For example, the application may be configured to define threads' logic associated with the object type(s) and may offload this logic as a hardware-based thread on the storage device side. The application may define the model of data representation and offload computation onto the storage device side, thus bypassing the file system or any other software layer.

In this manner, a user-space application can directly interact with a storage device, bypassing any complex functionality on the kernel-space side. The application may expose an internal representation of data (and a logic of data transformation) on the storage device side without needing to use file abstractions. This application-defined storage architecture concept guarantees high performance and low latency data operations.

FIG. 11 illustrates an example process 1100. The process 1100 may be performed for offloading computation into a storage device. Although depicted as a sequence of operations in FIG. 11, those of ordinary skill in the art will appreciate that various embodiments may add, remove, reorder, or modify the depicted operations.

At 1102, stream identifiers (i.e., stream ID) may be generated. Each of the stream identifiers may identify particular stream among a plurality of streams. The plurality of streams may be created or identified in a storage device. The plurality of streams may be created in the storage device in response to receiving information of defining the plurality of streams from an application on the host side. A stream descriptor may explain granularity, capacity, etc. of a stream, and the application may provide these details through a stream creation command. In examples, the storage device may identify a free ID in a bitmap and return the stream ID to the application. In embodiments, the application may provide a hash calculated from the name of a stream, and the storage device may need to have a dictionary that can associate hash with stream ID. Each of the plurality of streams may be configured to contain a sequence of objects of a same type (e.g., granularity) among a plurality of types of objects. For example, all objects in a particular sequence may be of the same type. The plurality of types of objects may be associated with one or more applications. For example, one application may create a stream for a particular data type, and another application may also use this stream. In another example, an application may create a private stream that can be used by the application only. Each of the plurality of streams may comprise a thread descriptor. The thread descriptor may be indicative of at least one algorithm. The at least one algorithm may be applied to the sequence of objects.

The stream identifiers may be initially stored into DRAM (or MRAM) in the storage device. At 1104, persistent memory areas for the plurality of streams may be allocated to persistently store objects in the plurality of streams into the storage device. For example, the storage device may comprise a controller. The controller may allocate or map erase blocks for the streams. For example, the controller may allocate or map erase blocks for the streams in the persistent memory of the storage device.

At 1106, computation associated with the plurality of streams containing data may be offloaded into the storage device. The plurality of streams contain data added into them. Computation associated with the plurality of streams containing data may be offloaded from the host side into the storage device. Data are added to the streams before offloading the computation associated with the streams into the storge device. The storage device may be associated with at least one computational core. For example, the application may be configured to define threads' logic associated with the object type(s) and may offload this logic as a hardware-based thread on the storage device side. The application may define the model of data representation and offload computation on the storage device side, thus bypassing the file system or any other software layer.

FIG. 12 illustrates an example process 1200. The process 1200 may be performed for offloading computation into a storage device. Although depicted as a sequence of operations in FIG. 12, those of ordinary skill in the art will appreciate that various embodiments may add, remove, reorder, or modify the depicted operations.

At 1202, a plurality of streams may be created in a storage device. The plurality of streams may be created in the storage device in response to receiving information of defining the plurality of streams from an application on a host side. The host may comprise a CPU for executing an application (e.g., applying algorithms to data) and a DRAM for keeping the application and data during execution. Each of the plurality of streams may be configured to contain a sequence of objects of a same type (e.g., granularity) among a plurality of types of objects. For example, all objects in a particular sequence may be of the same type. The plurality of types of objects may be associated with the application. Each of the plurality of streams may comprise a thread descriptor. The thread descriptor may be indicative of at least one algorithm. The at least one algorithm may be applied to the sequence of objects.

At 1204, computation associated with the plurality of streams containing data may be offloaded into the storage device. For example, the plurality of streams contain data added by the application. The storage device may be associated with at least one computational core. The computational core(s) may be created in multiple different ways. For example, a RISC-V core can implement a computational core. The RISC-V computational core may be cloned from an initial instance. The RISC-V computational core may execute algorithm logic by means of an eXecute-In-Place (XiP) technique. If a RISC-V core implements a computational core, at 1206, the computation associated with the plurality of streams may be executed by implementing an XiP technique. For example, the XiP technique may be implemented by accessing algorithm logic in NOR flash. The algorithm logic may alternatively, or additionally, be implemented by means of creating a specialized FPGA core. If the algorithm logic is implemented by means of creating a specialized FPGA core, at 1208, the computation associated with the plurality of streams may be executed by creating dedicated computational cores in FPGA.

FIG. 13 illustrates an example process 1300. The process 1300 may be performed for offloading computation into a storage device. Although depicted as a sequence of operations in FIG. 13, those of ordinary skill in the art will appreciate that various embodiments may add, remove, reorder, or modify the depicted operations.

At 1302, a plurality of streams may be created in a storage device. The plurality of streams may be created in the storage device in response to receiving information of defining the plurality of streams from an application on a host side. The host may comprise a CPU for executing an application (e.g., applying algorithms to data) and a DRAM for keeping the application and data during execution. Each of the plurality of streams may be configured to contain a sequence of objects of a same type (e.g., granularity) among a plurality of types of objects. For example, all objects in a particular sequence may be of the same type. The plurality of types of objects may be associated with the application. Each of the plurality of streams may comprise a thread descriptor. The thread descriptor may be indicative of at least one algorithm. The at least one algorithm may be applied to the sequence of objects.

A plurality of streams may be combined into a table. A stream may represent a column of the table. A storage device may be able to support the aggregation of streams into tables. At 1304, one or more tables may be created. The one or more tables may be created based on the plurality of streams. The one or more tables may be configured to implement data group operations. Each of the tables may comprise a plurality of streams. A table instance can be represented by a special metadata record, similar to the metadata record describing a stream instance.

Each table may be associated with a dedicated thread with special logic. The special logic may be configured to orchestrate the activity of streams' threads associated with that table. At 1306, computation associated with the table(s) containing data may be offloaded into the storage device. The table contains data added into it. Computation associated with the table(s) containing data may be offloaded from the host side into the storage device. Each of the tables may corresponds to a dedicated thread for orchestrating activity of threads associated with streams comprised in each of the tables.

FIG. 14 illustrates an example process 1400. The process 1400 may be performed for offloading computation into a storage device. Although depicted as a sequence of operations in FIG. 14, those of ordinary skill in the art will appreciate that various embodiments may add, remove, reorder, or modify the depicted operations.

At 1402, a plurality of streams may be created in a storage device. The plurality of streams may be created in the storage device in response to receiving information of defining the plurality of streams from an application on a host. The host may comprise a CPU for executing the application (e.g., applying algorithms to data) and a DRAM for keeping the application and data during execution. Each of the plurality of streams may be configured to contain a sequence of objects of a same type (e.g., granularity) among a plurality of types of objects. For example, all objects in a particular sequence may be of the same type. The plurality of types of objects may be associated with the application. Each of the plurality of streams may comprise a thread descriptor. The thread descriptor may be indicative of at least one algorithm. The at least one algorithm may be applied to the sequence of objects. Each of the plurality of streams may comprise an item descriptor. The item descriptor may comprise metadata that defines the size or granularity of one object instance. The item descriptor may comprise metadata describing the type, granularity, and sequence of object's fields. The item descriptor may comprise the number of objects, the capacity of the stream, etc.

At 1404, computation associated with the plurality of streams containing data may be offloaded into the storage device. The plurality of streams contain data added to them. Computation associated with the plurality of streams containing data may be offloaded into the storage device. The storage device may be associated with at least one computational core. For example, the application may be configured to define threads' logic associated with the object type(s) and may offload this logic as a hardware-based thread on the storage device side. The application may define the model of data representation and offload computation on the storage device side, thus bypassing the file system or any other software layer. At 1406, a result of the computation may be extracted from the storage device. For example, the result of the computation may be extracted from the storage device by the host.

FIG. 15 illustrates an example process 1500. The process 1500 may be performed for offloading computation. Although depicted as a sequence of operations in FIG. 15, those of ordinary skill in the art will appreciate that various embodiments may add, remove, reorder, or modify the depicted operations.

At 1502, a plurality of streams may be created in a storage device. The plurality of streams may be created in the storage device in response to receiving information of defining the plurality of streams from an application on a host. The host may comprise a CPU for executing the application (e.g., applying algorithms to data) and a DRAM for keeping the application and data during execution. Each of the plurality of streams may be configured to contain a sequence of objects of a same type (e.g., granularity) among a plurality of types of objects. For example, all objects in a particular sequence may be of the same type. The plurality of types of objects may be associated with one or more applications. For example, one application may create a stream for a particular data type, and another application may also use this stream. As another example, an application can create a private stream that can be used by the application only. Each of the plurality of streams may comprise a thread descriptor. The thread descriptor may be indicative of at least one algorithm. The at least one algorithm may be applied to the sequence of objects.

At 1504, an object may be added into a particular stream among the plurality of streams. For example, an object (e.g., data) may be added into a particular stream. The stream may be a particular stream in a particular table. Additionally, or alternatively, at 1506, a new stream may be created in the storage device. The new stream(s) may be defined by the application. Data may be added/filled to the new stream. At 1508, computation associated with the particular stream or the new stream may be offloaded into the storage device. For example, computation associated with the object or data added into the particular stream or the new stream containing data may be offloaded into the storage device. Data are added to the new stream before offloading the computation associated with new stream into the storge device. In another example, the new stream may encapsulate data from an existing stream that has been filled with the data before. The storage device may be associated with at least one computational core.

FIG. 16 illustrates an example process 1600. The process 1600 may be performed for offloading computation. Although depicted as a sequence of operations in FIG. 16, those of ordinary skill in the art will appreciate that various embodiments may add, remove, reorder, or modify the depicted operations.

At 1602, a plurality of streams may be created in a storage device. The plurality of streams may be created in the storage device in response to receiving information of defining the plurality of streams from an application on a host. The host may comprise a CPU for executing an application (e.g., applying algorithms to data) and a DRAM for keeping the application and data during execution. Each of the plurality of streams may be configured to contain a sequence of objects of a same type (e.g., granularity) among a plurality of types of objects. For example, all objects in a particular sequence may be of the same type. The plurality of types of objects may be associated with one or more applications. For example, one application may create a stream for a particular data type, but another application may also use this stream. As another example, an application can create a private stream that can be used by that application only. Each of the plurality of streams may comprise a thread descriptor. The thread descriptor may be indicative of at least one algorithm. The at least one algorithm may be applied to the sequence of objects.

At 1604, computation associated with the plurality of streams containing data may be offloaded into the storage device. The plurality of streams contain data added into them. Computation associated with the plurality of streams containing data may be offloaded from the host side into the storage device. Data are added to the streams before offloading the computation associated with the streams into the storge device. The storage device may be associated with at least one computational core. For example, the application may be configured to define threads' logic associated with the object type(s) and may offload this logic as a hardware-based thread on the storage device side. The application may define the model of data representation and offload computation onto the storage device side, thus bypassing the file system or any other software layer.

At 1606, an object may be deleted from one of the plurality of streams. The deletion of object(s) may be initiated by an application. For example, an application may define a moment of deleting data and/or stream(s). In another example, an object may be deleted from one of the plurality of streams in response to receiving a request from a user. Additionally, or alternatively, a stream may be deleted from the storage device. A stream can be deleted only if all objects in the stream were deleted (e.g., empty streams may be deleted). At 1608, one of the plurality of streams may be deleted from the storage device. For example, a stream may be deleted in response to receiving a request. The request may be received from the application or from a user. Additionally, or alternatively, a table may also be deleted from the storage device. At 1610, a table comprising at least a subset of the plurality of streams may be deleted from the storage device. For example, a table may be deleted in response to receiving a request. The request may be received from the application or from a user.

This programming model may facilitate the exposure and/or creation of a data representation on the storage device side that is compatible with the application's requirements and internal organization. The application-defined storage architecture may provide a way to build, access, or manipulate data in the storage device in the most efficient way that the application can define using application specific algorithms.

Figure 17:
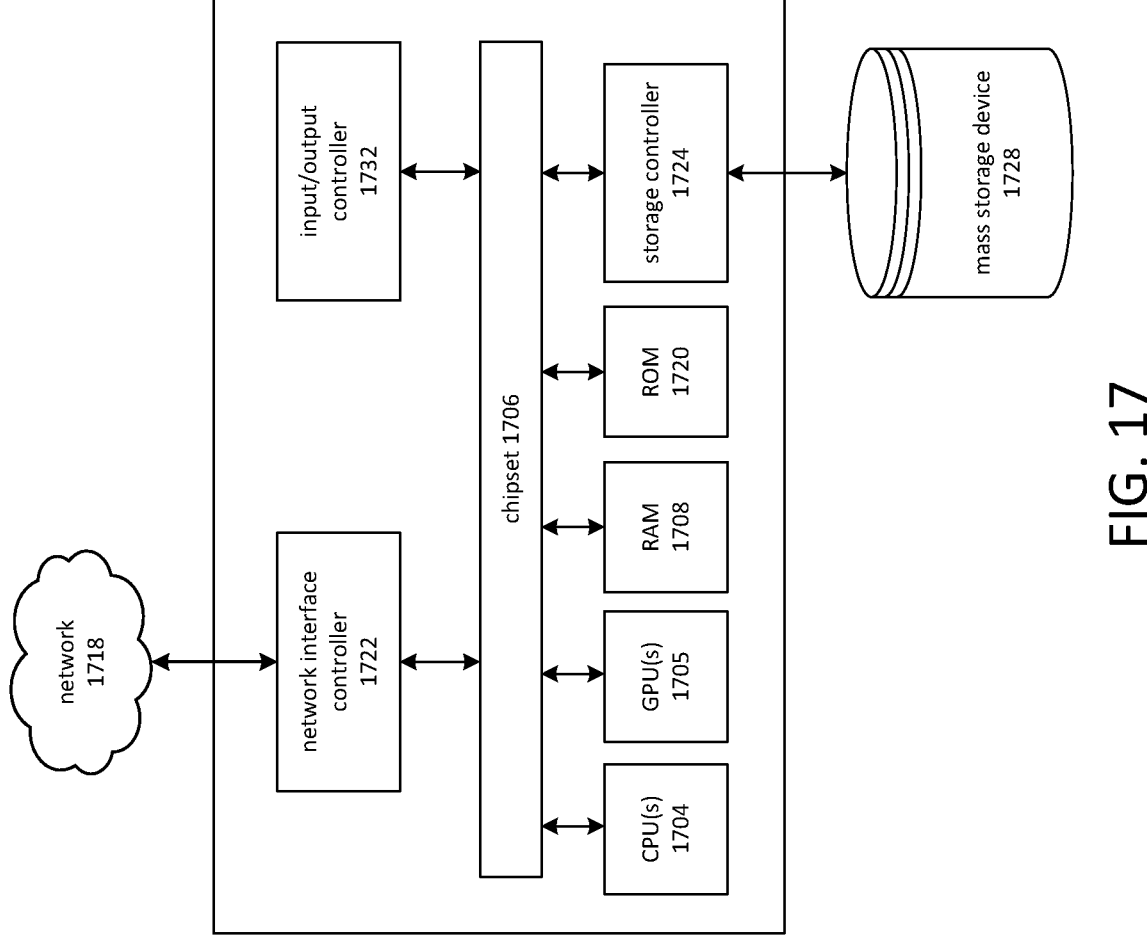
FIG. 17 shows an example computing device which may be used to perform any of the techniques disclosed herein.

FIG. 17 illustrates a computing device that may be used in various aspects, such as the host depicted in FIG. 1. The computer architecture shown in FIG. 17 shows a conventional server computer, workstation, desktop computer, laptop, tablet, network appliance, PDA, e-reader, digital cellular phone, or other computing node, and may be utilized to execute any aspects of the computers described herein, such as to implement the methods described herein.

The computing device 1700 may include a baseboard, or "motherboard," which is a printed circuit board to which a multitude of components or devices may be connected by way of a system bus or other electrical communication paths. One or more central processing units (CPUs) 1704 may operate in conjunction with a chipset 1706. The CPU(s) 1704 may be standard programmable processors that perform arithmetic and logical operations necessary for the operation of the computing device 1700.

The CPU(s) 1704 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1704 may be augmented with or replaced by other processing units, such as GPU(s) 1705. The GPU(s) 1705 may comprise processing units specialized for but not necessarily limited to highly parallel computations, such as graphics and other visualization-related processing.

A chipset 1706 may provide an interface between the CPU(s) 1704 and the remainder of the components and devices on the baseboard. The chipset 1706 may provide an interface to a random-access memory (RAM) 1708 used as the main memory in the computing device 1700. The chipset 1706 may further provide an interface to a computer-readable storage medium, such as a read-only memory (ROM) 1720 or non-volatile RAM (NVRAM) (not shown), for storing basic routines that may help to start up the computing device 1700 and to transfer information between the various components and devices. ROM 1720 or NVRAM may also store other software components necessary for the operation of the computing device 1700 in accordance with the aspects described herein.

The computing device 1700 may operate in a networked environment using logical connections to remote computing nodes and computer systems through local area network (LAN). The chipset 1706 may include functionality for providing network connectivity through a network interface controller (NIC) 1722, such as a gigabit Ethernet adapter. A NIC 1722 may be capable of connecting the computing device 1700 to other computing nodes over a network 1716. It should be appreciated that multiple NICs 1722 may be present in the computing device 1700, connecting the computing device to other types of networks and remote computer systems.

The computing device 1700 may be connected to a mass storage device 1728 that provides non-volatile storage for the computer. The mass storage device 1728 may store system programs, application programs, other program modules, and data, which have been described in greater detail herein. The mass storage device 1728 may be connected to the computing device 1700 through a storage controller 1724 connected to the chipset 1706. The mass storage device 1728 may consist of one or more physical storage units. The mass storage device 1728 may comprise a management component. A storage controller 1724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1700 may store data on the mass storage device 1728 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1728 is characterized as primary or secondary storage and the like.

For example, the computing device 1700 may store information to the mass storage device 1728 by issuing instructions through a storage controller 1724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1700 may further read information from the mass storage device 1728 by detecting the physical states or characteristics of one or more particular locations within the physical storage units.

In addition to the mass storage device 1728 described above, the computing device 1700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1700.

By way of example and not limitation, computer-readable storage media may include volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1728 depicted in FIG. 17, may store an operating system utilized to control the operation of the computing device 1700. The operating system may comprise a version of the LINUX operating system. The operating system may comprise a version of the WINDOWS SERVER operating system from the MICROSOFT Corporation. According to further aspects, the operating system may comprise a version of the UNIX operating system. Various mobile phone operating systems, such as IOS and ANDROID, may also be utilized. It should be appreciated that other operating systems may also be utilized. The mass storage device 1728 may store other system or application programs and data utilized by the computing device 1700.

The mass storage device 1728 or other computer-readable storage media may also be encoded with computer-executable instructions, which, when loaded into the computing device 1700, transforms the computing device from a general-purpose computing system into a special-purpose computer capable of implementing the aspects described herein. These computer-executable instructions transform the computing device 1700 by specifying how the CPU(s) 1704 transition between states, as described above. The computing device 1700 may have access to computer-readable storage media storing computer-executable instructions, which, when executed by the computing device 1700, may perform the methods described herein.

A computing device, such as the computing device 1700 depicted in FIG. 17, may also include an input/output controller 1732 for receiving and processing input from a number of input devices, such as a keyboard, a mouse, a touchpad, a touch screen, an electronic stylus, or other type of input device. Similarly, an input/output controller 1732 may provide output to a display, such as a computer monitor, a flat-panel display, a digital projector, a printer, a plotter, or other type of output device. It will be appreciated that the computing device 1700 may not include all of the components shown in FIG. 17, may include other components that are not explicitly shown in FIG. 17, or may utilize an architecture completely different than that shown in FIG. 17.

As described herein, a computing device may be a physical computing device, such as the computing device 1700 of FIG. 17. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described above may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method for increasing performance of data operations, comprising:

receiving, by a storage device, a request from an application to create a plurality of streams in the storage device, wherein the request comprises information defining a plurality of types of objects associated with the application;

storing the information defining the plurality of streams in a volatile memory of the storage device;

allocating one or more erase blocks for each of the plurality of streams in a persistent memory of the storage device based on the stored information defining the plurality of streams;

creating each of the plurality of streams in the allocated one or more erase blocks by the storage device and storing a sequence of objects of a same type among the plurality of types of objects in each of the plurality of streams, wherein each of the plurality of streams comprises a container that stores the sequence of objects of the same type among the plurality of types of objects, and wherein each of the plurality of streams comprises a thread descriptor indicative of at least one algorithm to be applied to the sequence of objects; and offloading computation associated with the objects stored in the plurality of streams into the storage device to bypass central processing unit (CPU)-based computation associated with the objects, the plurality of streams containing data, wherein the storage device comprises at least one computational core that is configured to perform the computation associated with the objects stored in the plurality of streams by applying the at least one algorithm to the sequence of objects contained in each of the plurality of streams.

2. The method of claim 1, further comprising:

generating stream identifiers (stream IDs) of identifying the plurality of streams.

3. The method of claim 1, further comprising:

executing the computation associated with the objects stored in the plurality of streams by implementing an execute-In-Place (XiP) technique.

4. The method of claim 1, further comprising:

executing the computation associated with the objects stored in the plurality of streams by creating dedicated computational cores in a Field Programmable Gate Array (FPGA).

5. The method of claim 1, further comprising:

creating one or more tables based on the plurality of streams, wherein the one or more tables are configured to implement data group operations; and offloading computation associated with the one or more tables into the storage device, the one or more tables containing data, wherein each of the one or more tables corresponds to a dedicated thread for orchestrating activity of threads associated with streams comprised in each of the one or more table.

6. The method of claim 1, wherein each of the plurality of streams further comprises an item descriptor, and the item descriptor comprises metadata associated with the sequence of objects in each of plurality of streams.

7. The method of claim 1, further comprising:

extracting a result of the computation by the application from the storage device.

8. The method of claim 1, further comprising:

adding an object into a particular stream among the plurality of streams; or creating a new stream in the storage device.

9. The method of claim 1, further comprising:

deleting an object from one of the plurality of streams in response to an initiation by the application or a user;

deleting one of the plurality of streams from the storage device in response to an initiation by the application or a user; or deleting a table configured to comprise at least a subset of the plurality of streams from the storage device in response to an initiation by the application or a user.

10. A system, comprising:

at least one processor; and at least one memory comprising computer-readable instructions that upon execution by the at least one processor cause the system to perform operations comprising:

receiving, by a storage device, a request from an application to create a plurality of streams in the storage device, wherein the request comprises information defining a plurality of types of objects associated with the application;

storing the information defining the plurality of streams in a volatile memory of the storage device;

allocating one or more erase blocks for each of the plurality of streams in a persistent memory of the storage device based on the stored information defining the plurality of streams;

creating the plurality of streams in the allocated one or more erase blocks by the storage device and storing a sequence of objects of a same type among the plurality of types of objects in each of the plurality of streams, wherein each of the plurality of streams comprises a container that stores the sequence of objects of the same type among the plurality of types of objects, and wherein each of the plurality of streams comprises a thread descriptor indicative of at least one algorithm to be applied to the sequence of objects; and offloading computation associated with the objects stored in the plurality of streams into the storage device to bypass central processing unit (CPU)-based computation associated with the objects, the plurality of streams containing data, wherein the storage device comprises at least one computational core that is configured to perform the computation associated with the objects stored in the plurality of streams by applying the at least one algorithm to the sequence of objects contained in each of the plurality of streams.

11. The system of claim 10, the operations further comprising:

generating stream identifiers (stream IDs) of identifying the plurality of streams.

12. The system of claim 10, the operations further comprising:

executing the computation associated with the objects stored in the plurality of streams by implementing an execute-In-Place (XiP) technique.

13. The system of claim 10, the operations further comprising:

executing the computation associated with the objects stored in the plurality of streams by creating dedicated computational cores in a Field Programmable Gate Array (FPGA).

14. The system of claim 10, the operations further comprising:

creating one or more tables based on the plurality of streams, wherein the one or more tables are configured to implement data group operations; and offloading computation associated with the one or more tables into the storage device, the one or more tables containing data, wherein each of the one or more tables corresponds to a dedicated thread for orchestrating activity of threads associated with streams comprised in each of the one or more table.

15. The system of claim 10, the operations further comprising:

extracting a result of the computation by the application from the storage device.

16. A non-transitory computer-readable storage medium, storing computer-readable instructions that upon execution by a processor cause the processor to implement operations, the operation comprising:

receiving, by a storage device, a request from an application to create a plurality of streams in the storage device, wherein the request comprises information defining a plurality of types of objects associated with the application;

storing the information defining the plurality of streams in a volatile memory of the storage device;

allocating one or more erase blocks for each of the plurality of streams in a persistent memory of the storage device based on the stored information defining the plurality of streams;

creating each of the plurality of streams in the allocated one or more erase blocks by the storage device and storing a sequence of objects of a same type among the plurality of types of objects in each of the plurality of streams, wherein each of the plurality of streams comprises a container that stores the sequence of objects of the same type among the plurality of types of objects, and wherein each of the plurality of streams comprises a thread descriptor indicative of at least one algorithm to be applied to the sequence of objects; and offloading computation associated with the objects stored in the plurality of streams into the storage device to bypass central processing unit (CPU)-based computation associated with the objects, the plurality of streams containing data, wherein the storage device comprises at least one computational core that is configured to perform the computation associated with the objects stored in the plurality of streams by applying the at least one algorithm to the sequence of objects contained in each of the plurality of streams.

17. The non-transitory computer-readable storage medium of claim 16, the operations further comprising:

generating stream identifiers (stream IDs) of identifying the plurality of streams.

18. The non-transitory computer-readable storage medium of claim 16, the operations further comprising:

executing the computation associated with the objects stored in the plurality of streams by implementing an execute-In-Place (XiP) technique; or executing the computation associated with the objects stored in the plurality of streams by creating dedicated computational cores in a Field Programmable Gate Array (FPGA).

19. The non-transitory computer-readable storage medium of claim 16, the operations further comprising:

creating one or more tables based on the plurality of streams, wherein the one or more tables are configured to implement data group operations; and offloading computation associated with the one or more tables into the storage device, the one or more tables containing data, wherein each of the one or more tables corresponds to a dedicated thread for orchestrating activity of threads associated with streams comprised in each of the one or more table.

20. The non-transitory computer-readable storage medium of claim 16, the operations further comprising:

extracting a result of the computation by the application from the storage device.

* * * * *